(12) United States Patent
Allen-Ware et al.

(10) Patent No.: US 9,304,886 B2
(45) Date of Patent: *Apr. 5, 2016

(54) ASSOCIATING ENERGY CONSUMPTION WITH A VIRTUAL MACHINE

(71) Applicant: International Business Machines Corporation, Armonk, NY (US)

(72) Inventors: Malcolm S. Allen-Ware, Austin, TX (US); Bishop Brock, Austin, TX (US); Tilman Gloekler, Gaertringen (DE); Charles R. Lefurgy, Austin, TX (US); Karthick Rajamani, Austin, TX (US); Gregory S. Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/772,673

(22) Filed: Feb. 21, 2013

(65) Prior Publication Data

US 2014/0149779 A1    May 29, 2014

Related U.S. Application Data

(63) Continuation of application No. 13/686,415, filed on Nov. 27, 2012.

(51) Int. Cl.
| | | |
|---|---|---|
| *G06F 1/32* | (2006.01) | |
| *G06F 1/26* | (2006.01) | |
| *G06F 9/455* | (2006.01) | |
| *G06F 11/30* | (2006.01) | |
| *G06F 11/34* | (2006.01) | |

(52) U.S. Cl.
CPC .......... *G06F 11/3062* (2013.01); *G06F 1/3206* (2013.01); *G06F 9/45558* (2013.01); *G06F 11/3013* (2013.01); *G06F 11/3051* (2013.01); *G06F 11/3476* (2013.01); *G06F 1/26* (2013.01); *G06F 2009/45591* (2013.01); *G06F 2201/815* (2013.01); *G06F 2201/86* (2013.01)

(58) Field of Classification Search
CPC ..................................................... G06F 1/3206
USPC ......................................................... 713/300
See application file for complete search history.

(56) References Cited

U.S. PATENT DOCUMENTS

| | | | | |
|---|---|---|---|---|
| 6,738,864 | B2 * | 5/2004 | Chauvel | 711/130 |
| 7,979,686 | B1 * | 7/2011 | Robles | 712/244 |
| 8,191,155 | B2 * | 5/2012 | Haruki et al. | 726/27 |

(Continued)

OTHER PUBLICATIONS

Bohra, Ata E. et al., "VMeter: Power Modelling for Virtualized Clouds", IEEE publication 2010, pp. 1-18.

(Continued)

*Primary Examiner* — Jaweed A Abbaszadeh
*Assistant Examiner* — Cheri Harrington
(74) *Attorney, Agent, or Firm* — DeLizio Law, PLLC

(57) ABSTRACT

Associating processor and processor core energy consumption with a task such as a virtual machine is disclosed. Various events cause a trace record to be written to a trace buffer for a processor. An identifier associated with a task using a processor core of the processor is read. In addition, one or more values associated with an energy consumption of the processor core are read. In response to the event, the one or more values associated with the energy consumption of the processor core and the identifier are written to the trace buffer memory.

8 Claims, 6 Drawing Sheets

(56) References Cited

U.S. PATENT DOCUMENTS

| | | | |
|---|---|---|---|
| 8,788,739 B2* | 7/2014 | Chang et al. | 711/6 |
| 2003/0167460 A1* | 9/2003 | Desai et al. | 717/151 |
| 2004/0044914 A1* | 3/2004 | Gedeon | 713/300 |
| 2008/0301473 A1 | 12/2008 | Perez et al. | |
| 2009/0049312 A1* | 2/2009 | Min | 713/300 |
| 2009/0319758 A1* | 12/2009 | Kimura | 712/220 |
| 2010/0268975 A1 | 10/2010 | Bose et al. | |
| 2011/0213997 A1 | 9/2011 | Kansal et al. | |
| 2011/0239015 A1* | 9/2011 | Boyd | G06F 1/3203 713/320 |
| 2012/0239323 A1 | 9/2012 | Mcgrane et al. | |
| 2012/0260117 A1 | 10/2012 | Acar et al. | |
| 2012/0330802 A1* | 12/2012 | Guthrie et al. | 705/34 |
| 2013/0007494 A1* | 1/2013 | Branover | G06F 1/3203 713/323 |
| 2014/0149752 A1 | 5/2014 | Brock et al. | |

OTHER PUBLICATIONS

Kansal, Aman et al., "Virtual Machine Power Metering and Provisioning", kansal@microsoft.com; nkothari©usc.edu; arka@cse.iitkgp.ernet.in 2010, pp. 1-12.

Krishnan, Bhavani et al., "VM Power Metering: Feasibility and Challenges", {bhavani.krishnan, amur}@gatech.edu, {ada, schwan}©cc.gatech.edu 2011, pp. 1-5.

Stoess, Jan et al., "Energy Management for Hypervisor-Based Virtual Machines", USENIX Annual Technical Conference { stoess, chiang, bellosa} ©ira.uka.de 2007, pp. 1-14.

"U.S. Appl. No. 13/686,415 Office Action", Dec. 4, 2014, 24 pages.

"U.S. Appl. No. 13/686,415 Final Office Action", Jun. 5, 2015, 26 Pages.

Ata E, et al., "VMeter: Power Modelling for Virtualized Clouds", International Parallel & Distributed Processing Symposium (IPDPS) © 2010 IEEE, 2010, pp. 1-18.

Huang, et al., "Accurate Fine-Grained Processor Power Proxies", Proceedings of the 45th Annual International Symposium on Microarchitecture, Dec. 2012, 2012, 11 pages.

Kansal, et al., "Virtual Machine Power Metering and Provisioning", ACM Symposium on Cloud Computing (SOCC), 2010, 2010, 12 pages.

Krishnan, et al., "VM Power Metering: Feasibility and Challenges", Sigmetrics Perform. Eval. Rev., vol. 38, No. 3, 2011, pp. 56-60, 2011, pp. 56-60.

Stoess, et al., "Energy Management for Hypervisor-Based Virtual Machines", In 2007 USENIX, Santa Clara, CA, Jun. 2007, 2007, pp. 1-14.

* cited by examiner

ASSOCIATING ENERGY CONSUMPTION WITH A VIRTUAL MACHINE

RELATED APPLICATIONS

This application claims the priority benefit of United States of America application Ser. No. 13/686,415 filed Nov. 27, 2012.

BACKGROUND

Embodiments of the inventive subject matter generally relate to the field of computers, and, more particularly, to associating energy consumption of a virtual machine or other task running on a computer.

A significant portion of the operating cost for large data centers and cloud computing environments is related to the energy costs associated with the data center or cloud servers. In such environments, virtual machines may be assigned to run tasks on behalf of a user. The virtual machines are typically assigned to run on one or more cores of a multicore system. A data center or cloud operator may desire to bill a user for the energy consumed by a virtual machine when running on a processor core. However, there is currently no way to directly measure the energy consumed by a processor core. As a result, previous systems have used various models to estimate power consumption of a virtual machine. However, such models typically use performance based values that do not necessarily correlate well with energy consumption.

SUMMARY

Various embodiments are disclosed in which energy consumption for a task such as a virtual machine is determined. Various events cause a trace record to be written to a trace buffer for a processor. An identifier associated with a task using a processor core of the processor is read. In addition, one or more values associated with an energy consumption of the processor core are read. In response to the event, the one or more values associated with the energy consumption of the processor core and the identifier are written to the trace buffer memory.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to associating energy consumption of processor cores with virtual machines, energy consumption of processor cores may be associated with other tasks or groups of tasks. In other instances, well-known instruction instances, protocols, structures and techniques have not been shown in detail in order not to obfuscate the description.

In general, the embodiments provide a means for associating energy consumption of processor cores with tasks running on the processor cores, for example virtual machines. Various sensor points detect or measure activity associated with energy consumption of processor cores that execute instructions and access memory on behalf of virtual machines running on a system. An identifier for a virtual machine running on a processor core is provided to the core. A variety of events may trigger a trace buffer record to be written to a memory, where the trace buffer includes data associated with the energy consumption of the core and the virtual machine that was running on the core at the time the trace buffer record was written. The records in the trace buffer can be aggregated and analyzed to determine energy consumption associated with the virtual machines running on the system.

Figure 1:
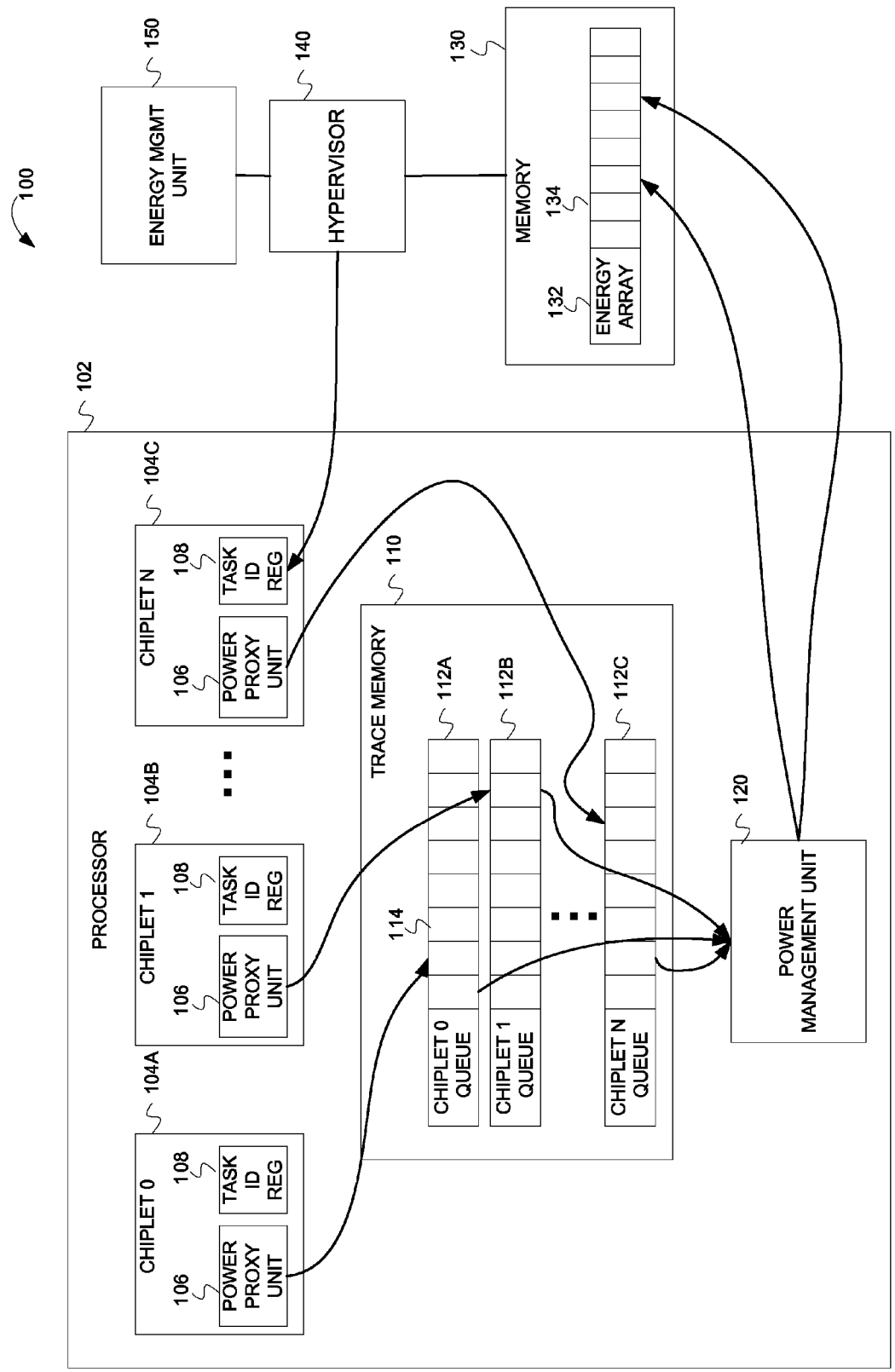
FIG. 1 depicts a system for associating energy consumption with a task according to embodiments.

FIG. 1 depicts a system 100 for associating energy consumption with a task according to embodiments. In some embodiments, system 100 includes processor 102, memory 130, and hypervisor 140 and may optionally include energy management unit 150.

Processor 102 is a multicore processor where the processor cores are provided in chiplets 104. Although three chiplets (e.g., chiplets 104A, 104B and 104C) are illustrated in FIG. 1, those of skill in the art having the benefit of the disclosure will appreciate that a processor 102 may have more or fewer chiplets 104. In addition to chiplets 104, processor 102 includes trace memory 110 and power management unit 120.

A chiplet 104 includes a processor core, memory (e.g., L2 and L3 cache) and supporting logic units for the processor core. Chiplet 104 also includes a power proxy unit 106 ("power proxy 106") and task identification (ID) register 108. Task ID register 108 is a special purpose register that stores an identifier for a task executing on the processor core of chiplet 104. Power proxy 106 collects and generates data associated with energy consumption of the processor core of chiplet 104. Certain events such as timer expiration, voltage changes etc. cause power proxy 106 to write a trace buffer record 114 to a chiplet queue 112 associated with the chiplet in trace memory 110 of processor 102. Trace memory 110 contains a chiplet queue 112 for each chiplet on processor 102. Trace buffer record 114 includes various data elements related to energy consumption associated with the chiplet. Further details on the data elements of a trace buffer record 114 are provided below with reference to FIG. 3. In some embodiments, chiplet queue 112 is a circular queue configured to store eight trace buffer records 114. The number of trace buffer records 114 that are maintained in a chiplet queue 112 may be a function of the size of trace memory 110 and the number of chiplets on processor 102. It is desirable that the number of trace buffer records be large enough to avoid data being overwritten before it is processed by power management unit 120. Trace memory 110 may be part of processor 102 as illustrated in FIG. 1. Those of skill in the art having the benefit of the disclosure will appreciate that trace memory 110 may be located on other components accessible to processor 102.

Power management unit 120 periodically reads the trace records 114 from chiplet queues 112 and processes the data such that data from trace records 114 that are associated with the same task ID are aggregated together. In some embodiments, power management unit reads and processes trace records every 32 milliseconds. It is desirable to choose an interval that avoids data being overwritten in a trace record in queue 112 before power management unit 120 can process the trace record. As trace records are processed, power management unit increments a queue pointer for the queue to point to the next trace record. Power management unit 120 then adds the data aggregated by task ID to an energy array 132 in a memory 130 accessible by hypervisor 140. Energy array 132 maintains energy consumption data for tasks and in some embodiments is indexed according to the task identifier. For example, in some embodiments, energy array 132 may be indexed by a task ID comprising a virtual machine identifier. Power management unit 120 accumulates energy consumption values by adding currently processed energy consumption values for tasks to values already stored in energy array 132, using the task identifier as an index into the energy array.

Hypervisor 140 manages a virtualized operating environment and provides virtualized resources (e.g., virtualized hardware resources) for system 100. Hypervisor 140 manages virtual machines (also referred to as partitions) executing on various computers of system 100. A virtual machine runs an operating system and applications within the virtual machine. The operating system and applications running on one virtual machine may be completely different from the operating system and applications running on other virtual machines. For example, one virtual machine may be running an accounting system on the AIX operating system while another virtual machine may run file server applications on a Linux operating system. Alternatively, a virtual machine may run the same operating system and applications as another virtual machine and serve as a backup in case of a failure or overload in the other virtual machine. From the point of view of a virtual machine, the virtual machine appears to be an independent computer that controls the underlying hardware when in reality, each virtual machine is sharing hardware resource with other virtual machines.

In some implementations, when hypervisor 140 schedules a virtual machine to run on a processor core, hypervisor 140 writes the virtual machine identifier associated with the virtual machine to task ID register 108 of the chiplet 104 for the processor core that is to execute the virtual machine. Power proxy 106 reads the virtual machine identifier from task ID register 108 and stores the virtual machine identifier in trace buffer records 114 as energy consumption values for the chiplet 104 are written to the chiplet queue 112 in trace memory 110.

As illustrated in FIG. 1, in some embodiments, power management unit 120 is an on-chip controller that is provided on processor 102. In alternative embodiments, power management unit 120 may be separate from processor 102. In further alternative embodiments, the functions provided by power management unit 120 related to processing trace records 114 in trace memory 110 may be performed by hypervisor 140. In such embodiments, hypervisor 140 accesses trace memory 110 directly to process the records.

Energy management unit 150 provides energy management functions across a number of computing systems. For example, energy management unit 150 may provide energy management functions for a data center or for computing systems that support a cloud computing environment. An example of an energy management unit is the IBM Systems Director Active Energy Manager from IBM Corporation. In some embodiments, energy management unit 150 periodically queries hypervisor 140 to obtain energy consumption data associated with tasks (e.g., virtual machines) managed by the hypervisor.

Figure 2:
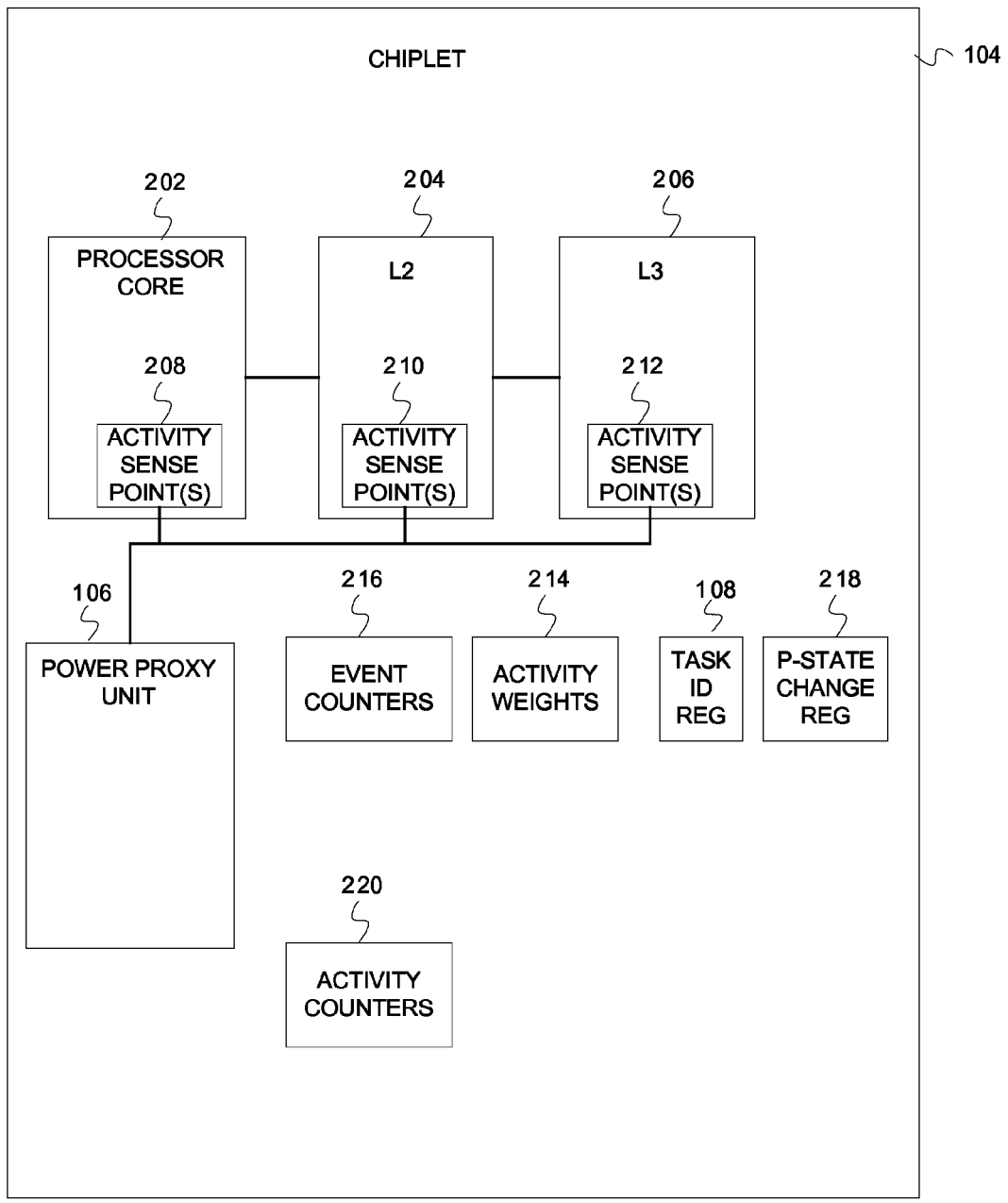
FIG. 2 depicts a chiplet according to embodiments.

FIG. 2 provides further details regarding a chiplet 104 according to embodiments. Chiplet 104 includes a processor core 202, L2 cache memory 204 and L3 cache memory 206. Processor core 202, L2 cache memory 204 and L3 cache memory 206 each include one or more activity sense points 208, 210 and 212. An activity sense point detects events that may be correlated with energy consumption of a component. For example, activity sense points 208 may detect events associated with processor core functions such as load and store operations, instruction dispatch, fixed point operations, floating point operations and other processor core functions. Activity sense points 210 and 212 may detect events associated with L2 and L3 cache reads and writes. Each of these events has an associated energy consumption value. As events are detected at the activity sense points 208, 210 and 212, event counters 216 associated with the events may be incremented by power proxy 106. In some embodiments, power proxy 106 may also weight the various activities detected at sense points 208, 210 and 212 using activity weights 214. The activity weights 214 adjust the event counters 216 according to the energy consumption associated with a particular event relative to other events. For example, counters associated with floating point events may be weighted higher than counters associated with cache lookup events on the basis that floating point operations use more power than cache lookups.

Activity weights 214 may be configurable. For example, activity weights 214 may be maintained in memory or registers that may be written by hypervisor 140 or by a configuration utility.

Generally speaking, the events that are counted in event counters 216 and specific values for activity weights 214 may be determined by modeling differing workloads and regression testing to determine the combination of activities and weightings that provide the strongest correlation with actual energy consumption of the system being tested. In some embodiments, event counters may be associated with various combinations of one or more of instructions dispatched, instructions completed, execution register file accesses, execution pipeline issue types, instruction fetch unit events, load-store unit cache events, load-store unit D-ERAT (effective-to-real data address translation) events, load-store unit prefetch events, L2 cache reads/writes and L3 cache reads/writes. Those of skill in the art having the benefit of the disclosure will appreciate that other events could be counted.

The above-described events may be associated with various voltage domains depending on a voltage source. For example, in some embodiments, a Vdd voltage domain includes events associated with a voltage rail feeding core and cache logic, while a Vcs voltage domain includes events associated with a Vcs rail feeding the L2 and L3 cache. Both the Vdd and Vcs voltage may be controlled by VRMs (Voltage Regulator Modules) and may vary over time. Those of skill in the art having the benefit of the disclosure will appreciate that the number and types of voltage domains present may vary and may be implementation specific.

Activity counters 220 represent a weighted sum of the events associated with a particular voltage domain. Thus for a Vdd voltage domain:

$$\text{Vdd Activity Count} = \text{event\_counter1} * \text{event\_weight1} + \ldots + \text{event\_counter}N * \text{eventweight}N$$

where the event counters included in the calculation are those events associated with a Vdd voltage. Similar activity counts may be calculated for events associated with other voltage domains, for example a Vcs voltage domain.

In some embodiments, chiplet 104 includes a P-state (Power State) change register 218. P-state change register 218 provides a mechanism for hypervisor 140 to signal voltage change points. Such changes may cause power proxy 106 to write a new trace buffer record element 114 to the chiplet queue 112 associated with the chiplet in trace memory 110.

Figure 3:
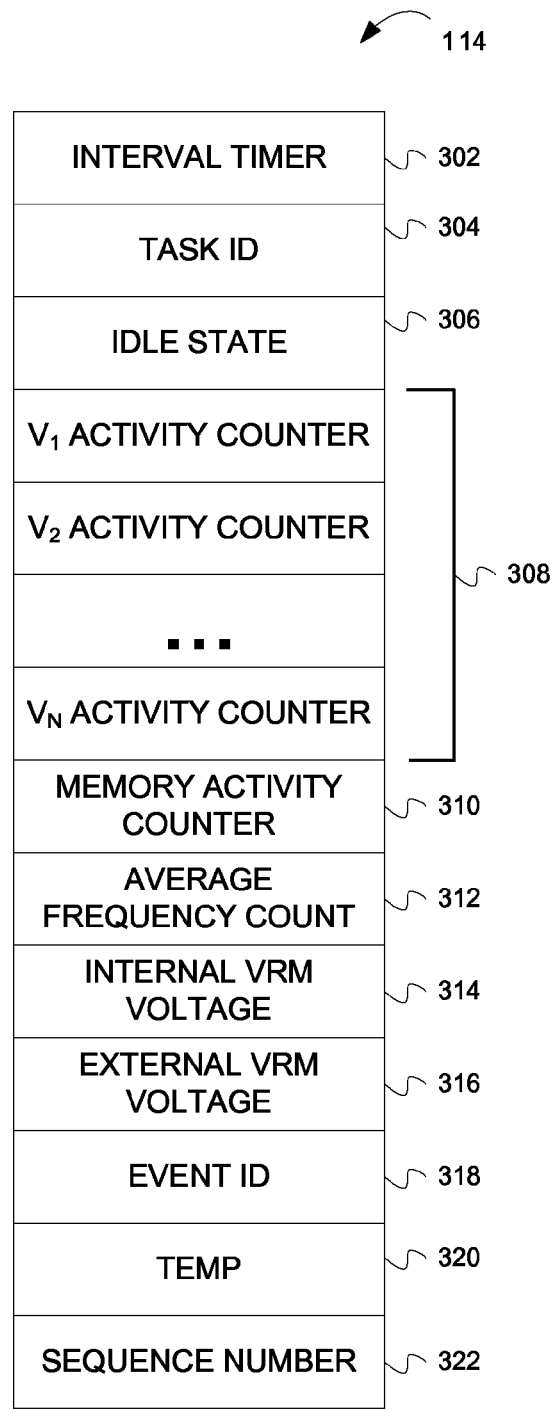
FIG. 3 depicts a trace buffer record used in some embodiments

FIG. 3 depicts an example data structure for a trace buffer record 114. In some embodiments, the fields in trace buffer record 114 include an interval timer 302, task ID 304, idle state 306, one or more activity counters 308, memory activity counter 310, average frequency count 312, internal VRM (Voltage Regulator Module) voltage 314, external VRM voltage 316, event ID 318, core temperature 320 and sequence number 322.

Interval timer 302 stores a value that represents a time interval since the last write of a trace buffer record 114 by the power proxy.

Task ID 304 is the task ID of the task running on the core at the time the trace buffer record 114 is written. This value can be obtained from task ID register 108.

Idle state 306 is a value representing the idle state of the processor core at the time the trace buffer record 114 is written. In some embodiments, the idle state 306 value indicates one of a non-idle state, a nap state, a sleep state, a "winkle" state (i.e., a deeper sleep), or a wakeup state for the processor core.

Activity counters 308 store values for one or more activity counters 220 maintained by a power proxy 106. As described above, in some embodiments, counters associated with particular voltage domains may be summed into one element. The calculated and weighted sums for the various activity counters associated with the voltage domains may be written to activity counters 308. Memory activity counter 310 is a counter associated with memory reads and writes performed by a processor core.

Average frequency count 312 is a value representing the average frequency of the processor core over the time interval being measured. Both voltage and frequency can be changed by various components of the system. For example, a performance supervisor or a safety supervisor on chiplet 104 may request a voltage or frequency change. Additionally, hypervisor 140 can request a voltage or frequency change. Using the average frequency count can provide for a more accurate measure of energy consumption over the time interval when compared to the instantaneous or current frequency if the frequency has changed over the interval being measured.

Internal VRM (Voltage Regulator Module) voltage 314 is a voltage value for an internal VRM for the processor 102. An internal VRM controls voltage for components on a processor 102.

External VRM voltage 316 is a voltage value for an external VRM. An external VRM controls voltage supplied to a processor 102.

Event ID 318 is a value representing the event that triggered the power proxy unit 106 to write the trace record 114. In some embodiments, the events may include a timer expiration, a change in the value of the task ID register indicating that the task being executed by the processor core has changed, entering an idle state, exiting an idle state, changes in the internal or external voltage, or changes in an internal or external VRM status. Those of skill in the art having the benefit of the disclosure will appreciate that other events can cause the power proxy unit 106 to write a new trace buffer record 114 to a chiplet queue 112. In cases where the event indicates a value has changed (e.g., task ID change, voltage change, etc.), the trace record 114 will be written using the value before the change occurred.

Core temperature 320 is a value that represents the temperature provided by a temperature sensor for the processor core. Temperature correlates well with energy consumption of a processor and related components and can be used as an input to determine estimated power consumption.

Sequence number 322 is a value indicating the sequence number of the trace buffer record 114 and can be used by the power management unit to detect data loss or invalid records. In some embodiments, sequence number 322 includes a valid bit indicating whether the record in the queue contains valid data or is available for writing.

The trace buffer record elements described above are examples of elements included in an example embodiment. Those of skill in the art having the benefit of the disclosure will appreciate that not all of the elements above will be present in every embodiment and that other elements may be included in the trace buffer record in alternative embodiments.

Figure 4:
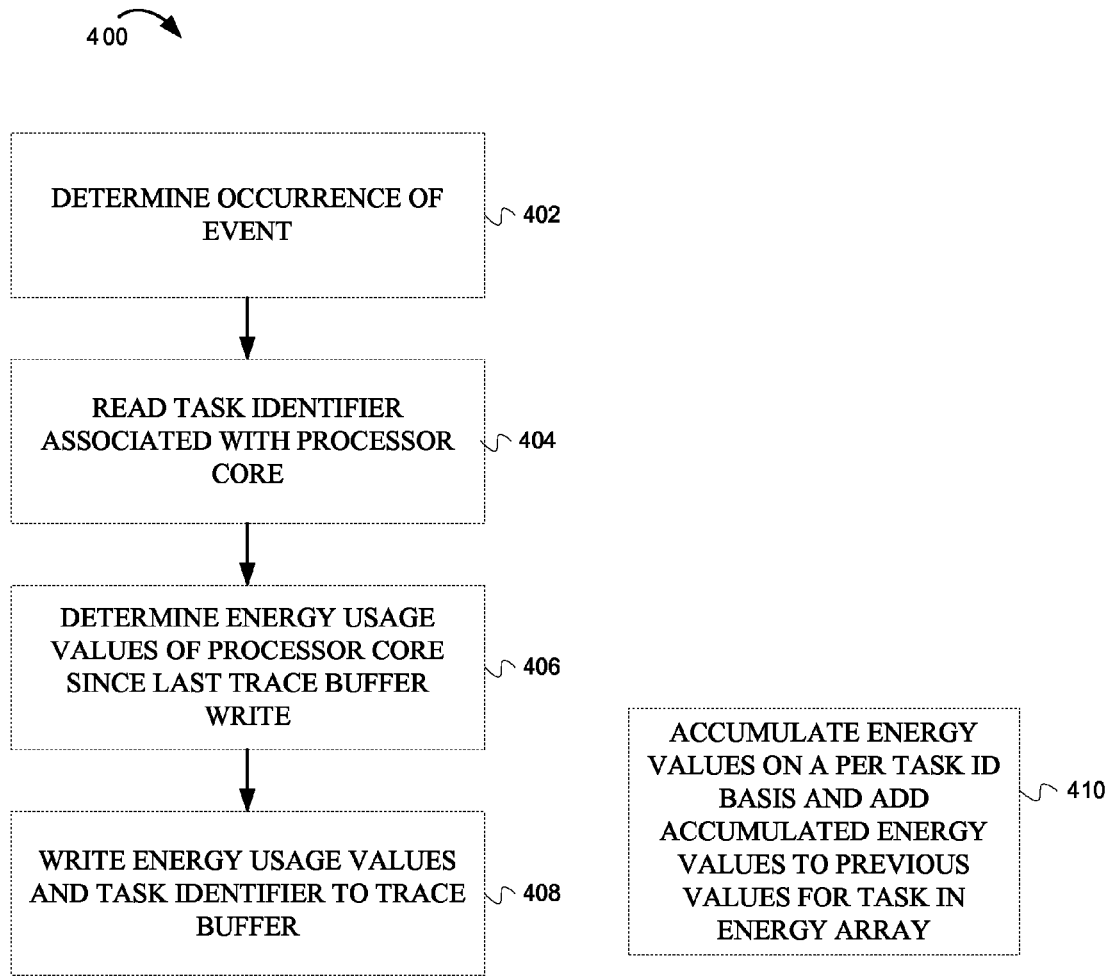
FIG. 4 is a flowchart illustrating a method for associated energy consumption with a virtual machine.

FIG. 4 is a flowchart illustrating a method 400 for associating energy consumption with a task such as a virtual machine. The method begins at block 402, where a system or component executing the method determines that an event has occurred. As noted above, the event can be any of a timer expiration, a change in the value of the task ID register indicating that the task being executed by the processor core has changed, entering an idle state, exiting an idle state, changes in the internal or external voltage, or changes in an internal or external VRM status.

Blocks 404-408 may be executed in response to detecting the event at block 402. The event may be a timer expiration, a change in the value of the task ID associated with a task running on a processor core thus indicating that the task being executed by the processor core has changed, entering an idle state, exiting an idle state, changes in the internal or external voltage, or changes in an internal or external VRM status. Those of skill in the art having the benefit of the disclosure will appreciate that other may be detected.

At block 404, a task identifier associated with a task executing on a processor core is read. In some embodiments, the task identifier is read from a register that is written by a hypervisor or operating system when a task is assigned to the processor core. The task identifier may be a task specific identifier such as a virtual machine identifier or a process identifier. Alternatively, the task identifier may be associated with a group of tasks that are to be grouped together for purposes of determining energy consumption.

At block 406 energy usage values representing energy use since the last trace record written by the power proxy unit are determined. As discussed above, such values may include activity counters representing energy consuming events, voltage values, and frequency values may also be determined.

At block 408, the energy usage values determined at block 406 are written to a chiplet queue in a trace buffer. In some embodiments, a trace buffer record 114 (FIGS. 1 and 3) is written. A pointer for the chiplet queue in the trace buffer is advanced in anticipation of the next write to the chiplet queue.

Block 410 may be executed independently of blocks 402-408. In some embodiments, block 410 may be executed at periodic intervals. For example, block 410 may be executed every 250 microseconds. At block 410, one or more records are read from the trace buffer. In some embodiments, each available record is processed to determine the total energy consumption represented by the record according to the data in the record. For example, an energy consumption for each of the activity counters associated with the particular voltage domains in the record may be summed to determine a total energy consumption associated with the record. The contributions of each voltage domain activity counter to the total energy consumption represented by the record may be adjusted based on voltage, temperature, and frequency values in the record. For example, in some embodiments, the trace record energy for a voltage domain Vdom may be determined according to:

$$\text{Energy } Vdom = a * Vdom \text{ Activity Counter} * \left(\frac{Vdom\_voltage}{Vdom\_reference}\right)^b +$$
$$c * \text{frequency} * \left(\frac{Vdom\_voltage}{Vdom\_reference}\right)^d +$$
$$Pref * (1 + e * (temp_{reference} - temp_{record})) * \left(\frac{Vdom\_voltage}{Vdom\_reference}\right)^f$$

where Vdom_voltage is the measured voltage for the domain, Vdom_reference is a reference voltage determined during manufacturing testing performed on a reference chip, frequency is the average frequency from the trace record, temprecord is the processor core temperature from the trace record, temprefrence is the temperature of a core of the reference chip measured during manufacturing testing of the chip at an operating voltage of Vdom_reference. Pref is the leakage power measured from the reference chip during manufacturing testing. Pref may be measured when the chip is operating at Vdom_reference and tempreference. Parameters a, b, c, d, e, and f are fitting parameters determined during regression testing the reference chip. The fitting parameters and reference values may be stored in a data area for the chip, for example a Vital Product Data (VPD) area. The calculation above may be performed for each of the voltage domains in the record (e.g., Vdd, Vcs voltages etc.) The energy values for each domain as calculated according to the formula above may be summed to produce a total energy consumption associated with the record.

The formula above includes parameters that correlate with leakage power and clock power, and thus the energy consumption associated with leakage power and clock power may be included with the power consumption associated with a task. Those of skill in the art having the benefit of the disclosure will appreciate that other means of accounting for leakage power and clock power may be used and are within the scope of the inventive subject matter.

The total energy consumption for the record represents the total energy consumption associated with the task associated with the record during the interval of time represented by the record. In some embodiments, a total value in millijoules is calculated. This computed total energy consumption may be accumulated in the energy array 132 value that is indexed by the task identifier in the record, thereby providing a running total of energy consumption for the task.

Figure 5:
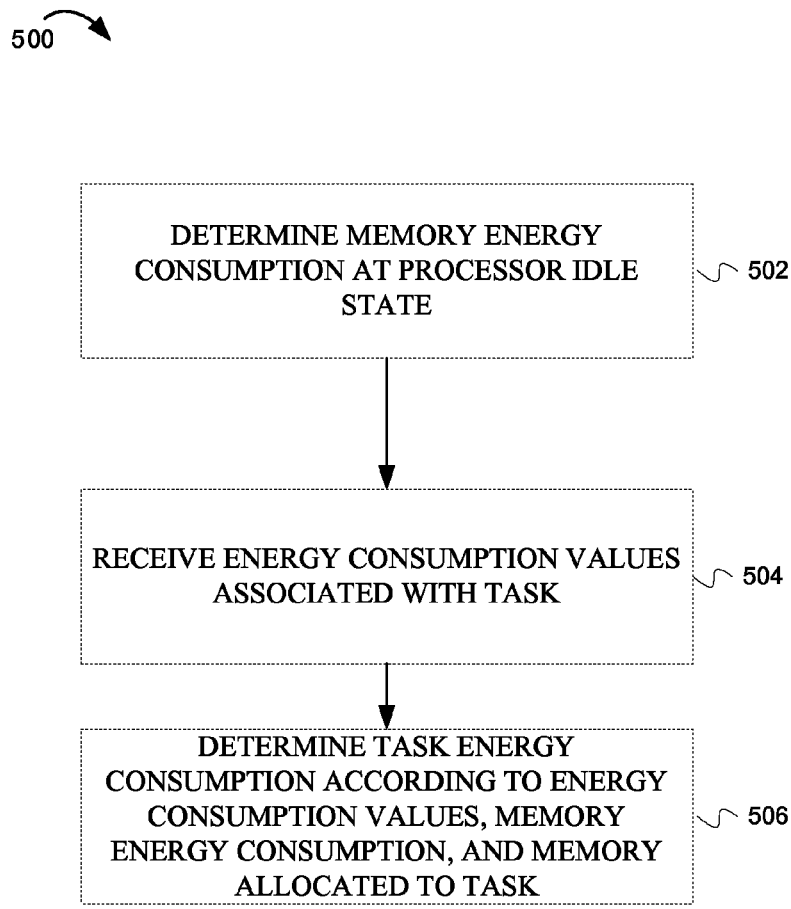
FIG. 5 is a flowchart illustrating a method for determining an energy consumption for a task such as a virtual machine.

FIG. 5 is a flowchart illustrating a method 500 for determining an energy consumption for a task such as a virtual machine. Method 500 begins at block 502 by determining memory energy consumption at an idle state. Determining memory energy consumption at an idle state allows for allocating energy use associated with memory to tasks even if the task is currently idle on the basis that a task such as a virtual machine occupies and uses memory even if the task is idle. The operations performed by block 502 may be performed once when a system boots and not repeated until a later reboot or memory size change.

At block 504, energy values associated with a task are received. In some embodiments, an energy array containing records of counter values associated with energy use of a task may be read using the task ID as an index into the array.

At block 506, a task energy consumption is determined using the values determined at block 504. The energy consumption for the task may be determined by reading the current energy consumption for the task from energy array 132. In addition, idle memory energy consumption may be allocated to the task. In addition, the amount of memory allocated to the task may be used to determine the energy consumed by the task related to memory.

Figure 6:
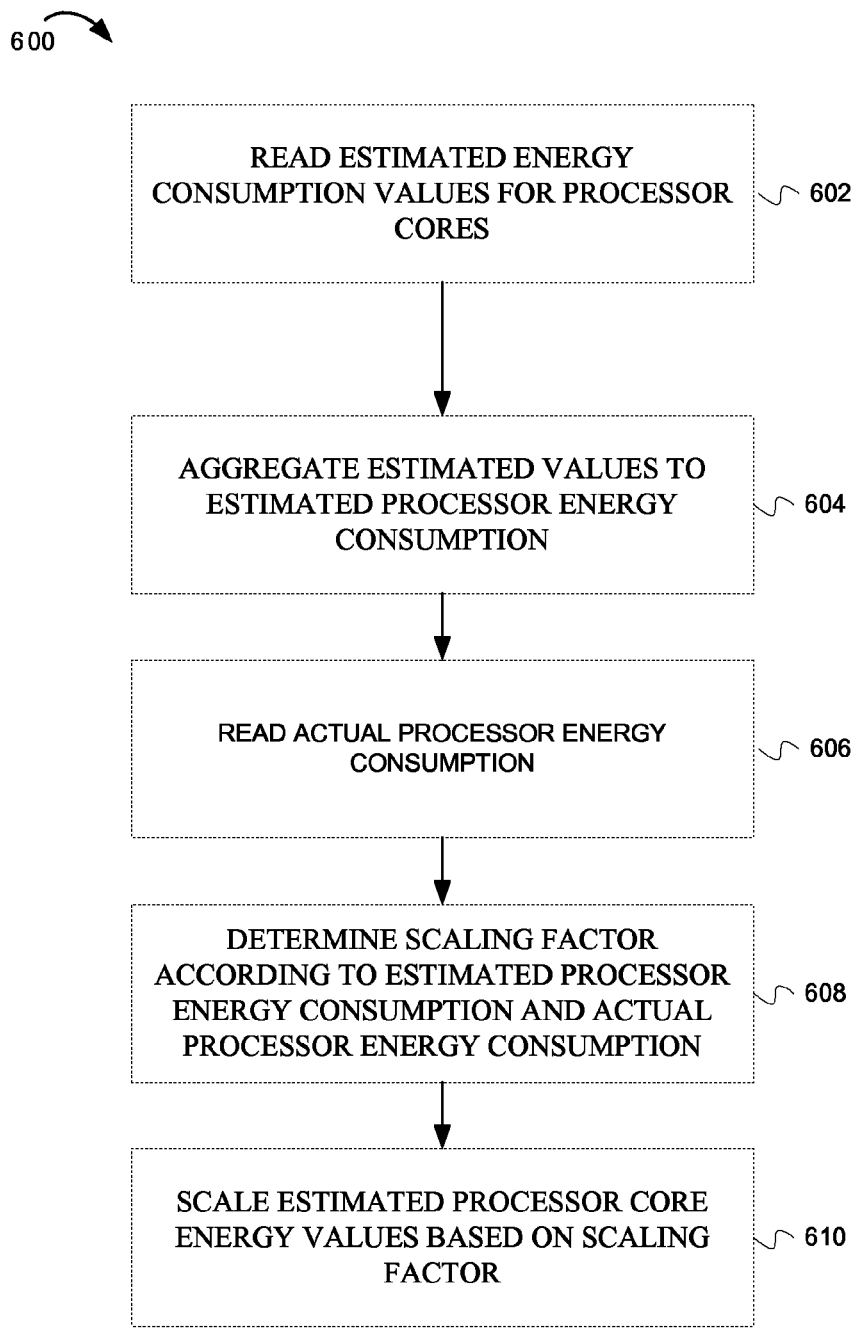
FIG. 6 is a flowchart illustrating a method for adjusting an energy consumption value according to a scaling factor.

FIG. 6 is a flowchart illustrating a method 600 for adjusting an energy consumption value according to a scaling factor. The method begins at block 602 by reading energy consumption counter, voltages and frequencies from an energy array.

At block 604, an estimated energy consumption value across all tasks and processor cores of the processor is determined by summing or averaging the values across all of the tasks executing on the processor cores of a processor.

At block 606, an actual energy consumption value for the processor is read. The actual energy consumption value may be determined from sensors measuring energy delivered to the processor.

At block 608, a scaling factor is determined according to the estimated energy consumption for the processor and the actual energy consumption value.

At block 610, the scaling factor may be applied to future energy values determined according to methods 400 or 500 described above. In some embodiments, method 600 may be repeated at periodic intervals to adjust the scaling factor.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for associating energy consumption of a processor core with a task such as a virtual machine as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
causing each of a plurality of processor cores to record, into a register associated with the processor core, a task identifier associated with a task to be executed on the processor core, wherein a processor comprises the plurality of processor cores;
in response to detection of a first event, causing those of the plurality of processor cores that correspond to the first event or that are executing a task corresponding to the first event to write energy consumption data of the processor core in association with the task identifier in the register associated with the processor core to a first memory shared by the plurality of processor cores,
wherein each of the plurality of processor cores has energy consumption data that indicates energy consumption by components associated with the processor core, and wherein the processor further comprises the first memory;
periodically, reading the energy consumption data and associated task identifier from the first memory;
aggregating the energy consumption data by task identifier;
for each task identifier read from the first memory, writing the aggregated energy consumption data to a second memory, wherein the second memory is external to the processor;
detecting a signal from a hypervisor at a power state change register; and
causing each of the plurality of processor cores to write additional energy consumption data of the processor core in association with the task identifier in the register associated with the processor core to the first memory shared by the plurality of processor cores.

2. The method of claim 1, wherein each task identifier identifies a virtual machine, wherein the second memory is accessible by the hypervisor.

3. The method of claim 1, wherein the first event is selected from a group consisting of: one or more of an expiration of a timer, a change in internal or external voltage for at least one of the plurality of processor cores, a change in frequency for at least one of the plurality of processor cores, a change in a voltage regulator module, a change in a power state for at least one of the plurality of processor cores, or a change in the task identifier indicated in the register associated with at least one of the plurality of processor cores.

4. The method of claim 1, further comprising:
determining an estimated energy consumption value for one of the plurality processor cores based at least in part on the aggregated energy consumption data from the second memory;

determining a scaling factor based on the estimated energy consumption value and an actual energy consumption value for the processor core; and scaling the energy consumption data for a task executing or executed on the processor core based, at least in part, on the scaling factor.

5. The method of claim 1, wherein the energy consumption data for one of the plurality of processor cores comprises energy consumption data for different voltage domains of the processor core.

6. The method of claim 1, wherein the energy consumption data aggregated by task identifier indicates energy consumption by each of a plurality of virtual machines.

7. The method of claim 1, wherein a second event is selected from a group consisting of: at least one of load and store operations, instruction dispatch, fixed point operations, floating point operations, cache reads, and cache writes.

8. The method of claim 7, wherein detection of the second event comprises:

detecting, by an activity sense point, the second event, wherein each of the plurality of processor cores comprises one or more activity sense points.

\* \* \* \* \*